Patented June 16, 1931

1,810,276

UNITED STATES PATENT OFFICE

ELOISE JAMESON AND EARL D. STEWART, OF CORONA, AND CLARENCE P. WILSON, OF POMONA, CALIFORNIA, ASSIGNORS TO CALIFORNIA FRUIT GROWERS EXCHANGE, OF LOS ANGELES, CALIFORNIA, A CORPORATION OF CALIFORNIA

FOOD PRODUCT AND PROCESS OF MAKING THE SAME

No Drawing. Application filed January 15, 1927. Serial No. 161,462.

Our invention relates to a food product and it is an object of the same to produce fruit juices in powdered form in a simple and economical manner.

The healthful properties and food value of milk sugar are well known and the value of fruit juice is also well known. Both kinds of food are of particular value in special diets as for invalids, children or people of impaired digestion.

Numerous attempts have been made to reduce fruit juices to powdered form in order to secure the advantages of compactness, commercial portability, etc., without appreciably sacrificing the original flavor and valuable dietary and medicinal properties of the fruit juice, namely, the natural sugars, fruit acids, mineral salts, vitamines, etc., but such efforts have met with poor or indifferent success because of the highly hygroscopic nature of fruit juice solids. The difficulty has been overcome in the past by adding to the juice a large portion of a dextrin containing product of starch hydrolysis.

We have made a study of the hygroscopicity of various sugars and have discovered that lactose is less hygroscopic than any other available sugar and that when lactose is present in an amount equal to 10% or more of the fruit juice solids present in this juice the mixture of fruit juice and lactose can be dehydrated and the resulting dry mixture of fruit juice solids and lactose is relatively non-hygroscopic and retains the desirable properties of the fruit juice and the lactose.

It may be desirable to have a high proportion of lactose in the mixture and we have discovered that any proportion desired up to the saturation point of the fruit juice or fruit juice solution may be used and will give a substantially non-hygroscopic product.

As a specific example we may place 1000 kilograms of lemon juice in a mixing kettle. A typical lemon juice would contain 9.6% dissolved solids, and therefore the 1000 kilograms of juice would contain 96 kilograms of lemon juice solids. Let us say that the finished product is to contain 20% of lactose and 80% lemon juice solids. Then $$96 : x = 80 : 20$$
$$X = 24.$$

Therefore 24 kilograms of lactose are to be dissolved in the lemon juice, after which the solution is dehydrated in any suitable way. It is preferred to use a spray drier so that dehydration is accomplished in as short a time as possible and at a relatively low temperature. Any suitable drying device may be used however, so long as the vitamines and other valuable properties are retained practically unimpaired in the final product.

Since lactose is not very sweet other sugars may be added if desired to give a sweetened product.

By the expression "relatively non-hygroscopic" we mean that the product in powder, granular or flake form can be handled under ordinary atmospheric conditions without difficulty from the product becoming lumpy or gummy. It is to be noted also that if the product is very dry so that substances normally carrying water of crystallization are in the anhydrous state the delicate fruit flavors are retained much more perfectly than when moisture is present and in any event the drier the product is the better it keeps.

While we have stated a typical formula and method of procedure, it is to be understood, however, that we do not limit ourselves to these features since other materials, proportions and procedures are within the true scope of our invention, as will be obvious to those skilled in the art to which it relates, therefore, we do not limit ourselves in these or other respects, except as indicated in the appended claims.

Having fully described our said invention, what we claim and desire to secure by Letters Patent is:

1. A dry and relatively non-hygroscopic fruit juice product comprising as essential elements thereof a homogeneous mixture of lactose and fruit juice solids.

2. A new food product consisting of a practically dry and relatively non-hygroscopic homogeneous mixture of citrus fruit juice solids and lactose.

3. The process of making a practically dry and relatively non-hygroscopic mixture of fruit juice solids and lactose which comprises dissolving lactose in fruit juice and then reducing the mixture to a dry state.

4. The process which includes the steps of dissolving lactose in citrus fruit juice and then spray-drying the mixture.

5. A spray dried mixture of fruit juice composition and lactose.

6. A dry relatively non-hygroscopic mixture of highly hygroscopic fruit juice solids and lactose.

In testimony whereof we affix our signatures.

ELOISE JAMESON.
EARL D. STEWART.
CLARENCE P. WILSON.